H. N. EVANS, Sr.
GAGE COCK.
APPLICATION FILED SEPT. 3, 1912.
1,090,203.
Patented Mar. 17, 1914.
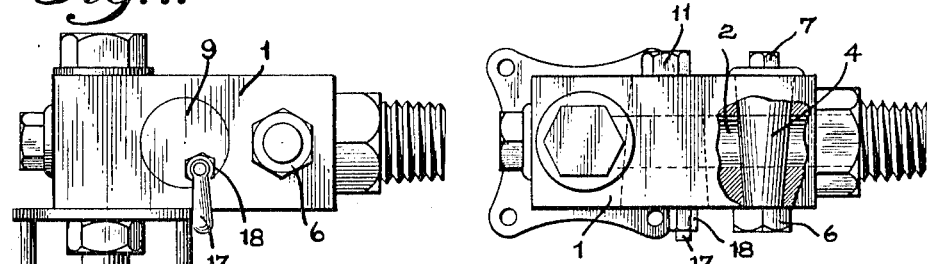
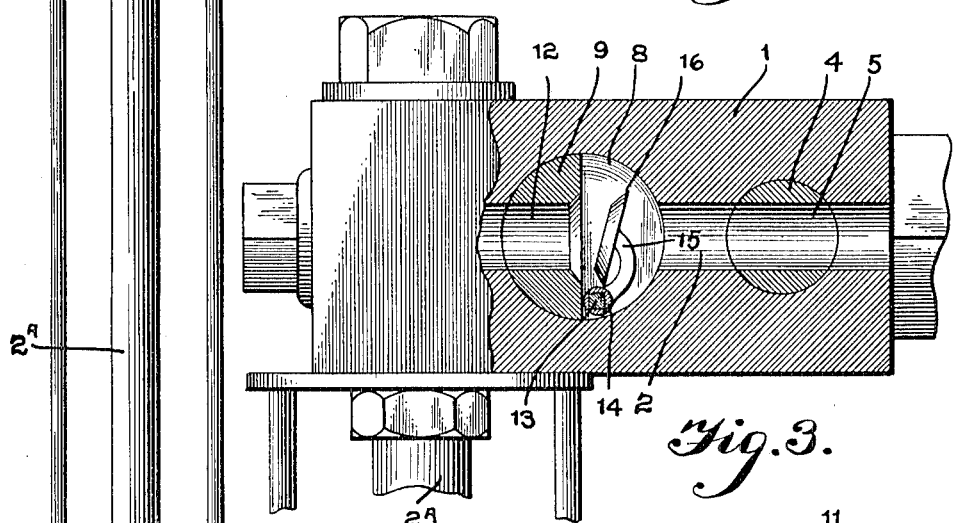
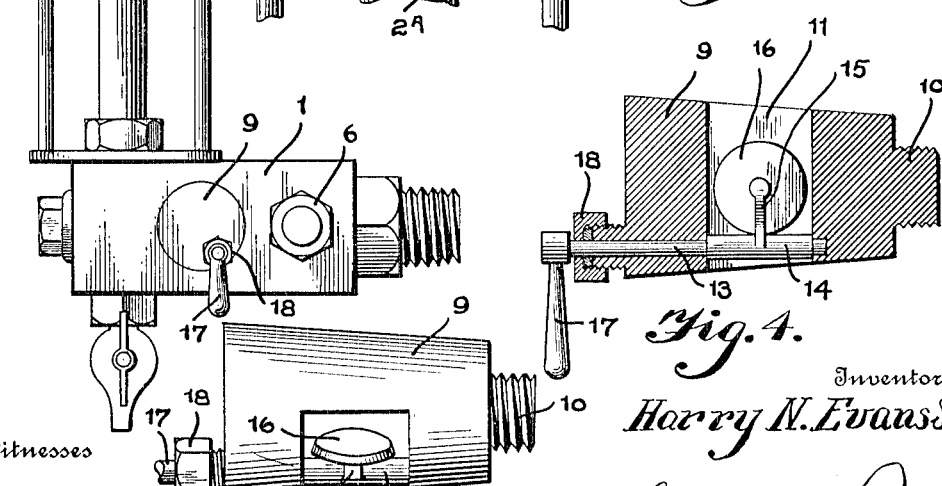
Witnesses
L. P. Moyer
R. H. Krenkel
Inventor
Harry N. Evans Sr.
By Joshua R. H. Potts
Attorney

UNITED STATES PATENT OFFICE.

HARRY N. EVANS, SR., OF PHILADELPHIA, PENNSYLVANIA.

GAGE-COCK.

1,090,203.

Specification of Letters Patent. Patented Mar. 17, 1914.

Application filed September 3, 1912. Serial No. 718,214.

*To all whom it may concern:*

Be it known that I, HARRY N. EVANS, Sr., a citizen of the United States, residing at Philadelphia, in the county of Philadelphia and State of Pennsylvania, have invented certain new and useful Improvements in Gage-Cocks, of which the following is a specification.

My invention relates to improvements in gage cocks, the object of the invention being to provide an improved construction of cock having a removable valve seat and valve with a turning plug in the passage through the cock between the said valve seat and the boiler.

A further object is to provide an improved construction of removable valve seat and valve which permits them to be readily removed and repaired without disconnecting the cock from the boiler.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements. Fig. 2 is a top plan view partly in section. Fig. 3 is a view partly in longitudinal section on an enlarged scale through one of the cocks. Fig. 4 is a view in longitudinal section through the removable valve seat, and Fig. 5 is a plan view of the valve seat and valve.

The upper and lower cocks 1, 1, which are connected by a glass tube 2ª and form the ordinary gage, are alike in construction in so far as my improvements are concerned, and hence the description of one cock will apply alike to both.

The cock 1 has a longitudinal bore 2 which is in direct communication with the boiler and extending across this bore 2 is a conical plug 4 which is provided with a circular opening 5 normally registering with the bore of the cock to permit a free passage through the same. This plug is held in open position by means of a nut 6 screwed onto one end thereof, and the opposite end of the plug is made angular as shown at 7 for the reception of a wrench to turn the same and close the cock. The cock 1 is provided with a transverse conical opening 8 to receive a conical plug 9. This plug 9 has a screw-threaded stud 10 on one end to receive a nut 11 screwed against the side of the cock to firmly hold the plug in place. The plug 9 constitutes a valve seat, and to distinguish this plug from the plug 4, I shall hereinafter term the same a valve seat, although it has the additional function of a valve support.

The valve seat 9 is provided in one side with a recess 11 which communicates with an opening 12 registering with the bore 2 of the cock. A shaft 13 extends through alined openings in the valve seat and across the recess 11, and this shaft at its portion which extends across the recess 11, is made angular to fit the angular bore of a sleeve 14. An arm 15 is provided on the sleeve 14, and is connected with a valve 16, which is adapted to close against the valve seat when the glass tube 2ª breaks. The valve, however, is normally open as shown in Fig 3, and an arm 17 is connected to the outer end of shaft 13, and is adapted to move the valve and control its position. The shaft 13 extends through a small stuffing box 18 to render the same steam tight.

By reference particularly to Fig. 2, it will be seen that the conical plug 4 and the conical valve seat 9 extend in opposite directions. This is done to facilitate the application of a wrench to the plug 4 with which the arm 17 might interfere if parts were differently positioned.

In normal operation, the valve 16 is open as shown. If the glass tube 2ª should break, the pressure back of the valve would cause it to quickly close and prevent the escape of water and steam from the boiler.

In use, the cocks become fouled and it is necessary to clean them in order to insure perfect working of the parts. By providing a removable valve seat with the plug 4 so located that it may be turned to shut off communication with the boiler, while the valve seat is being removed, I provide a structure which permits a repair and cleaning of the valve, and also of the seat for the valve. The removable seat therefore enables me to keep the automatic or check valve feature of the apparatus in perfect working order without disconnecting the cock from the boiler.

While I have illustrated my improvements in connection with details common to gages of this type, the invention is not limited to such features, but is broadly to the idea of a removable valve seat and valve and coöperative parts.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A gage cock having a transverse conical opening intersecting its longitudinal bore, a conical plug positioned in said opening and having a screw-threaded stud on its smaller end, a nut positioned against the outer face of the cock and screwed onto said stud, said plug having a recess in one side and an opening communicating with the recess and registering with the bore of the cock, a shaft positioned in the plug and extending across the recess, a valve connected to said shaft in the recess and adapted to close the opening in the plug, and means on the outer end of said shaft for turning the same, substantially as described.

2. A gage cock having a transverse conical opening intersecting its longitudinal bore, a conical plug positioned in said opening and having a screw-threaded stud on its smaller end, a nut positioned against the outer face of the cock and screwed onto said stud, said plug having a recess in one side and an opening communicating with the recess and registering with the bore of the cock, a shaft positioned in the plug and extending across the recess, an arm on said shaft in the recess, a valve fixed to the free end of said arm and adapted to close against the valve seat, and a shaft turning arm on the outer end of said shaft, substantially as described.

In testimony whereof I have signed my name to this specification in the presence of two subscribing witnesses.

HARRY N. EVANS, Sr.

Witnesses:
C. R. ZIEGLER,
S. W. FOSTER.

---

Copies of this patent may be obtained for five cents each, by addressing the "Commissioner of Patents, Washington, D. C."